United States Patent [19]
Uchiyama

[11] Patent Number: 5,587,763
[45] Date of Patent: Dec. 24, 1996

[54] FOCUS DETECTION DEVICE AND METHOD

[75] Inventor: Shigeyuki Uchiyama, Tokyo, Japan

[73] Assignee: Nikon Corporation, Tokyo, Japan

[21] Appl. No.: 497,153

[22] Filed: Jun. 30, 1995

[30] Foreign Application Priority Data

Sep. 6, 1994 [JP] Japan .................... 6-212491

[51] Int. Cl.⁶ .................... G03B 3/00
[52] U.S. Cl. .................... 396/114; 396/128
[58] Field of Search .................... 354/402, 406–408

[56] References Cited

U.S. PATENT DOCUMENTS

| | | | |
|---|---|---|---|
| 5,357,310 | 10/1994 | Kawamura et al. | 354/408 |
| 5,359,383 | 10/1994 | Miida et al. | 354/402 |
| 5,467,163 | 11/1995 | Uchiyama | 354/402 |
| 5,469,240 | 11/1995 | Uchiyama et al. | 354/406 |
| 5,485,002 | 1/1996 | Kusaka | 250/201.8 |
| 5,485,003 | 1/1996 | Kusada | 250/201.8 |

*Primary Examiner*—Safet Metjahic
*Assistant Examiner*—Eric Nelson
*Attorney, Agent, or Firm*—Oliff & Berridge

[57] ABSTRACT

A focus detection device permits accurate focus detection within a short length of time. The detection is quick even if there is an error between the output signal strings of a pair of image sensors when the photo lens is in the focused condition. A pair of effective signal strings is extracted from a pair of output signal strings of a pair of photoelectric conversion arrays. The extraction of the pair of effective signal strings is based on a numerical value relating to an error amount between the output signal strings when the photo lens is in the focused condition. The focus adjustment condition of the photo lens is calculated based on the pair of effective signal strings.

20 Claims, 7 Drawing Sheets

FOCUS DETECTION DEVICE AND METHOD

BACKGROUND OF THE INVENTION

1. Field of the Invention

The present invention relates to a focus detection device for use in a camera, still camera, video, or the like. The focus detection device detects a focus condition of an image in the photo-optical system.

2. Description of Related Art

Figure 6:
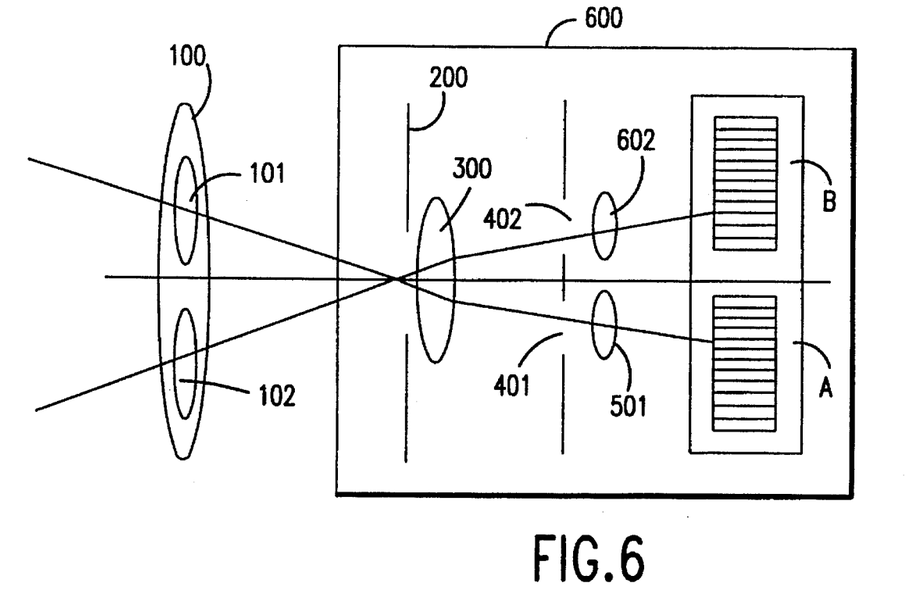
FIG. 6 is a drawing illustrating a conventional focus detection module.

Focus detection devices for cameras, which include position difference detection apparatus and methods, are known. FIG. 6 shows a known arrangement for a focus detection device that uses the position difference detection method. Light rays, which are incident to region 101 of the object lens 100, pass through, in order, a field mask 200, a field lens 300, an aperture stop 401, and re-imaging lens 501. The light rays form a subject image on a line image sensor array A. Line image sensor array A includes a plurality of photoelectric converting elements, which are linearly arranged to generate outputs according to the incident light's intensity.

Similarly, light rays, which are incident through region 102 of the object lens 100, pass through, in order, the field mask 200, the field lens 300, an aperture stop 402, and a re-imaging lens 502. The light rays form a subject image on a line image sensor array B. Line image sensor array B includes a plurality of photoelectric converting elements, which are linearly arranged to generate outputs according to the incident light's intensity.

The pair of subject images diverge in a front focus condition, when the object lens 100 forms an image of the subject in front of a pre-determined focus surface. The pair of subject images converge in a back focus condition, when object lens 100 forms an image of the subject behind the pre-determined focus surface. In the focused condition, object lens 100 forms an image of the subject on the pre-determined focus surface. Therefore, the subject images of the line image sensor arrays A,B coincide with each other.

The pair of subject images undergoes photoelectric conversion by the line image sensor arrays A,B and is converted to electrical signals. The focus adjustment condition of the object lens 100, which here refers to the amount and direction of separation of the image from the focused condition (referred to hereafter as "the defocus amount"), is determined by mathematically processing these signals and calculating a relative shift amount of the subject images.

The field mask 200, field lens 300, aperture stops 401,402, re-imaging lens 501,502, and the image sensor arrays A,B are combined into one module 600. The module 600 can be installed into a camera body.

The mathematical processing method by which the defocus amount is calculated will next be described.

Figure 8A:
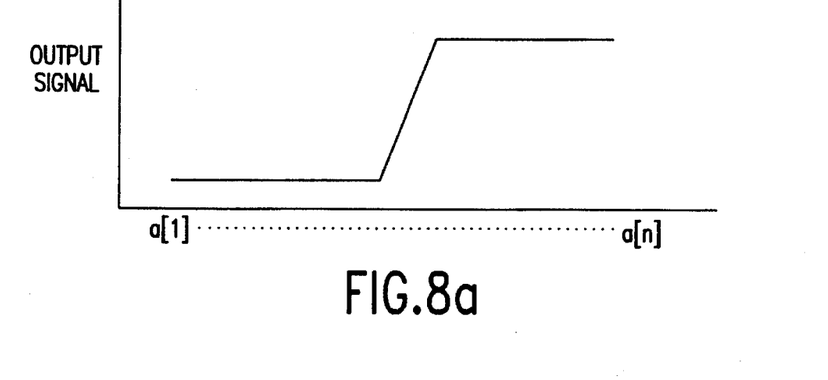
FIGS. 8(a)–8(c) are drawings illustrating conventional focus detection calculations.
Figure 8B:
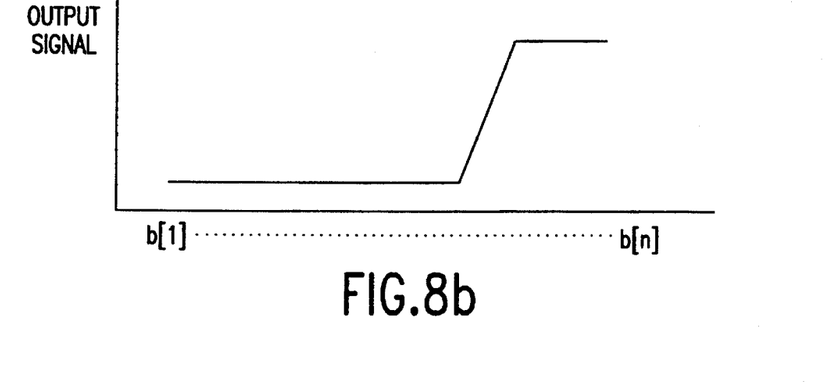

The line image sensor arrays A,B each comprise a plurality of photoelectric converting elements. Line image sensor arrays A,B have a plurality of outputs in the form of strings a[1], ... ,a[n] and b[1], ... ,b[n], respectively, as shown in FIGS. 8(a) and 8(b). Correlation calculations are carried out while the data in a specified range for the pair of output signal lines is stepwise shifted in amounts corresponding to fixed data. The range, where the maximum shift number is taken to be lmax, becomes −lmax to lmax. Specifically, the correlation amount C[L] is calculated through the following Equation (1).

$$C[L] = \Sigma |a[i+L] - b[i]| \tag{1}$$

where $L = -lmax, \ldots, -2, -1, 0, 1, 2, \ldots, lmax$ and $\Sigma$ indicates the summation of $i = k \rightarrow r$.

In Equation (1), L is an integer and represents the data line shift amount described above. The initial value k and the final value r change, depending on the shift amount L, as shown in Equation (2).

When $L \geq 0$:

$$k = k0 + INT\{-L/2\} \tag{2}$$

$$r = r0 + INT\{-L/2\}$$

When $L < 0$:

$$k = k0 + INT\{(-L+1)/2\}$$

$$r = r0 + INT\{(-L+1)/2\},$$

where k0 and r0 are the initial and final values when the shift amount L=0 and INT means the integer value for the relationship.

The combination of signals for calculating the absolute value of the difference between the signals from line image sensor arrays A,B in Equation (1), when the initial value k and the final value r are changed using Equation (2), and the calculating range, where the absolute value of the difference is added, is shown in FIG. 9. Thus, by changing the shift amount L, the ranges used for the correlation calculations shift in opposite directions to each other.

A focus detection method using initial value k and final value r, regardless of the shift amount L is also known. The range used for the correlation calculation for the string of one array is continually fixed, and only the other string shifts. Since the relative position shift amount becomes the shift amount L when the data coincides, the shift amount Lm that gives the local minimum value correlation amount among the correlation amounts C[L], is determined. This value, coupled with a constant, determined by the optical system of FIG. 6 and the pitch width of the image sensor arrays' photoelectric converting elements, becomes the defocus amount. Thus, as the maximum shift number lmax becomes larger, the defocus amount, at which detection can still be determined, becomes larger.

Figure 8C:
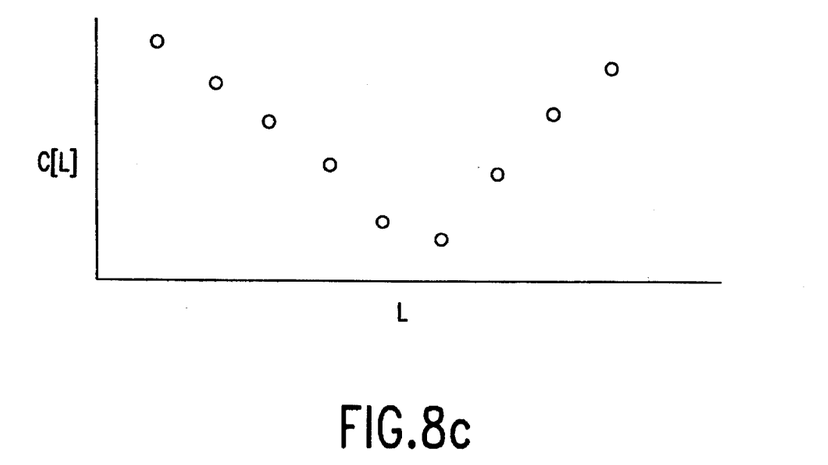
Figure 9A:
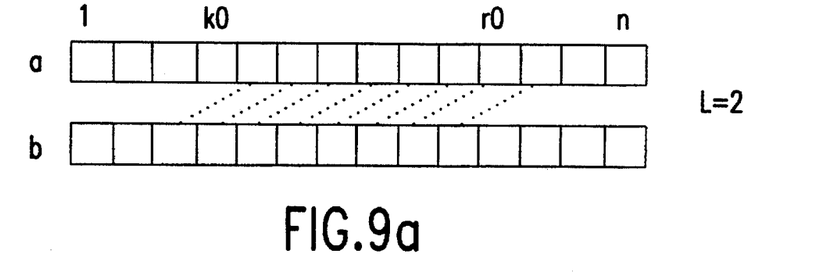
FIGS. 9(a)–9(e) are drawings illustrating conventional correlation calculations.
Figure 9B:
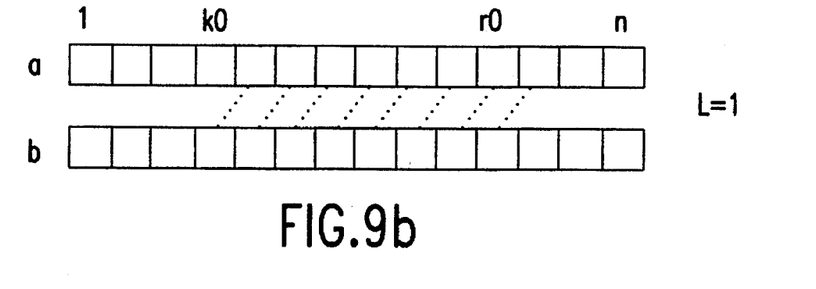
Figure 9C:
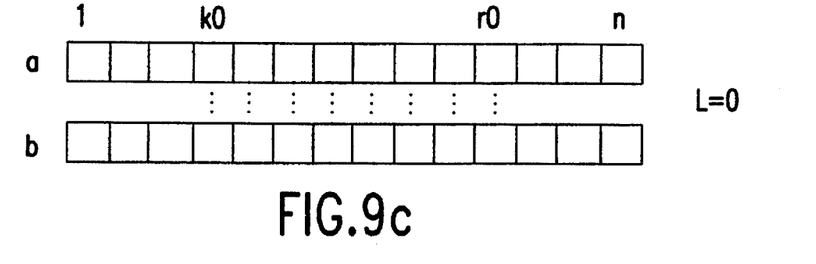
Figure 9D:
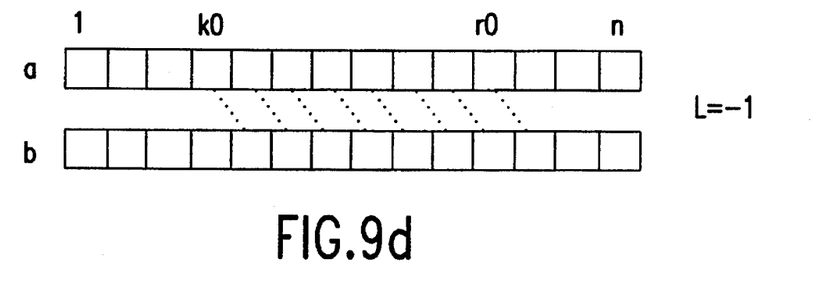
Figure 9E:
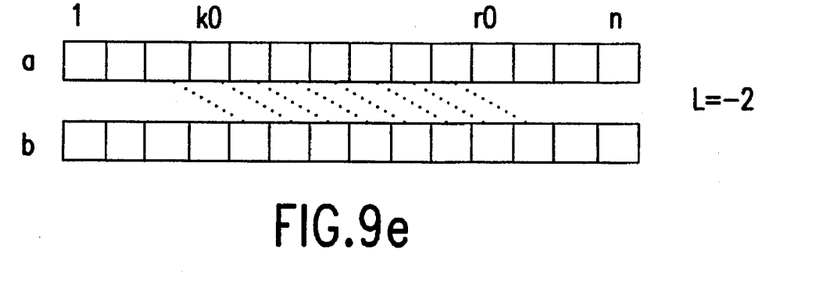

The correlation amounts C[L] are discrete as shown in FIG. 8(c). The smallest defocus amount that can be detected is limited by the pitch width of the photoelectric converting elements in the line image sensor arrays A,B. To overcome this limitation, Japanese Laid-Open Patent Application Sho 60-37513, corresponding to U.S. Pat. No. 4,561,479, sets forth a method, where a new local minimum value Cex is calculated by interpolating the discrete correlation amounts C[L] and then carrying out a detailed focus detection.

Figure 7:
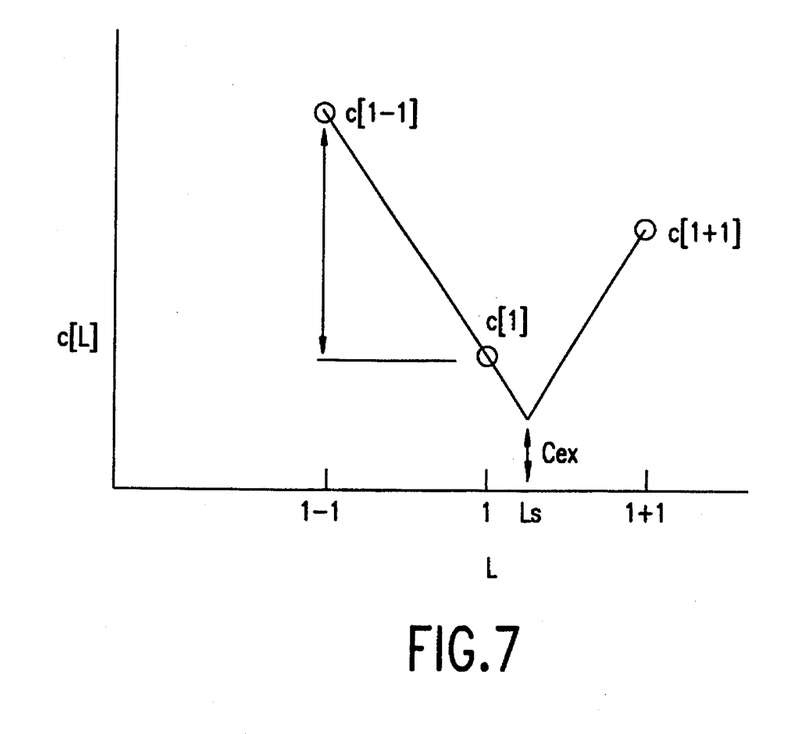
FIG. 7 is a drawing illustrating a conventional focus detection calculation.

As illustrated in FIG. 7, this method calculates a true local minimum value Cex and a shift amount Ls that gives Cex, using Equations (3) and (4).

$$DL = (C[l-1] - C[l+1])/2 \tag{3}$$

$$Cex = C[l] - |DL|$$

$$E = MAX\{C[l+1] - C[l], C[l-1] - C[l]\},$$

$$= MAX\{C(a), C(b)\}$$

where, DL is explained in U.S. Pat. No. 4,561,479, the correlation amount C[l] is the local minimum value and the correlation amounts, C[l+1] and C[l−1], are the shift amounts on either side of the correlation amount C[l], and l is an integer representing the local minimum shift amount.

$$Ls = l + DL/E \tag{4}$$

In Equation (3), MAX {C(a), C(b)} means that the largest value of C(a) and C(b) is selected. The defocus amount DF is calculated from the shift amount, Ls according to Equation (5).

$$DF = Kf \times Ls \quad (5)$$

where, Kf is a constant determined by the optical system of FIG. 6 and pitch width of the image sensor arrays photoelectric converting elements.

It may be necessary to determine whether the obtained defocus amount indicates the true defocus amount, or whether the defocus amount is inaccurate, due to noise or the like. When Equation (6) is satisfied, the defocus amount is considered accurate.

$$E > E1 \ \& \ Cex/E < G1 \quad (6)$$

where E1 and G1 are specified threshold values, and E indicates the changed correlation amount and depends on the subject's contrast. The larger the value of E, the higher the contrast and reliability. Cex, defined above, is the difference when the data most closely coincides and is initially 0.

However, due to the influence of noise and a parallax generated by regions 101, 102, Cex=0. Because higher contrast results in a smaller influence from noise and the difference of the subject images, Cex/E indicates the coincidence of the data. Obviously, the closer Cex/E is to 0, the higher the coincidence of the data and the higher the reliability.

The contrast relating to the data may also be calculated, instead of the numerical value E. A reliability evaluation can be carried out using this calculated contrast. When reliability has been determined, the object lens 100 is driven or a display based on the defocus amount DF is determined. Equations (1)–(6), consisting of correlation calculations, interpolation calculations and conditional evaluations, are referred to as focus detection calculations.

Another known focus detection device is disclosed in Japanese Laid-Open Patent Application Sho 60-37513. In this device, the correlation amounts C[L] are not calculated for the entire shift range, –lmax–lmax. Rather, shift amount L is first changed in order, to 0, 1, –1, 2, –2, . . . , lmax, –lmax. The correlation amounts C[L] are next calculated, and the calculated correlation amounts are then interrupted only when a reliable defocus amount satisfying Equation (6) is obtained. Thus, since C[0] is a local minimum when the object lens is near the focused condition, the defocus amount can be quickly calculated by calculating three correlation amounts C[0], C[1], and C[–1]. Therefore, if the subject is moving, the movement of the subject can be followed, and the object lens can be promptly focused on the subject.

However, because of errors in the initial positioning of module 600 in the camera, the signal strings output from line image sensors A,B will not perfectly coincide and errors will be generated, even when the object lens 100 is in a focused condition. Therefore, it is still necessary to correct the error generated between the signal strings (hereafter "error amount") when the object lens is in the focused condition. Thus, the defocus amount DF is calculated by Equation (7), rather than the Equation (5).

$$DF = Kf \times (Ls - Hz) \quad (7)$$

where Hz is a correction coefficient for the error amount Z. If Hz is taken to equal Z, when the error amount Z is expressed in units of the photoelectric conversion elements' pitch width, the correction coefficient Hz in Equation (7) becomes Z.

Since the error amount Z differs for each camera body, the error amount Z should be measured after the camera has been assembled. Alternatively, the error amount Z could be measured during assembly. The error amount Z is stored in a memory, such as an EEPROM or the like, within the camera body.

If the error amount Z of the line image sensor arrays A,B is stored in each camera and the calculated result is corrected each time the defocus amount is calculated using error amount Z, it is unnecessary for the signal strings to perfectly coincide, even when the photo lens is in the focused condition. Therefore, the freedom of design of the focus detection optical system increases. It becomes unnecessary to precisely adjust the module when installing it into the camera.

As is seen in FIG. 9, the error amount Z is either positive or negative. When the output representing the line image sensor array A is shifted to a smaller photoelectric conversion number, with respect to the output representing the line image sensor array B, Z becomes negative. When the image shifts in the reverse direction, error amount Z becomes positive.

When the error amount Z of the image sensors is smaller than the pitch width of the photoelectric conversion elements, there is no problem. However, when the error amount Z exceeds the pitch width of the photoelectric conversion elements, since the shift amount for a local minimum value in focusing moves in an amount equal to the error amount Z, the following problems occur:

(1) Since the focal point shifts from the center of shift range of –lmax to lmax, the defocus amount differs between the front focus and the rear focus in amount equal to the shift.

(2) In focus detection devices, which change the shift amount L to 0, 1, –1, 2, –2, . . . , calculate the correlation amounts C[L] and interrupt the correlation calculations when a reliable defocus amount satisfying Equation (6) is not found, extra calculation time is required. This increase of time correspondingly increases the correlation amount C[0] in an amount equal to the local minimum value.

For example, if the error amount Z is 2 photoelectric conversion element widths, the correlation amount C[L] equals its local minimum value when the shift amount L equals 2 during focusing. In Equation (4), when C[0] equals its local minimum value during focusing and the true local minimum value is to be calculated using three correlation amounts, C[0], C[1] and C[–1], the true local minimum value cannot be determined when the correlation amount C[L=2] becomes the local minimum value during focusing. The only way for the true local minimum value to be determined is to calculate the six correlation amounts C[0], C[1], C[–1], C[2], C[–2] and C[3].

SUMMARY OF THE INVENTION

It is an object of the invention to provide a focus detection device where accurate focus detection is possible within a short period of time. The focus detection occurs quickly, even if there is an error in signal strings output from image sensors when the photo lens is in a focused condition.

A focus detection device, for accomplishing this and other objectives, includes a pair of photoelectric line image sensor arrays having a plurality of photoelectric conversion elements. The focus detection optical system guides a pair of light rays from the subject through an object lens to the pair of photoelectric line image sensor arrays, where the pair of subject images are formed. The pair of photoelectric line image sensor arrays output a pair of signal strings corresponding to the light intensity distribution of the pair of subject images. A focus detection algorithm device determines the focus adjustment condition of the lens based on the pair of output signal strings from the line image sensor arrays.

The focus detection device also incudes a memory, which stores a numerical value relating to an error amount between the pair of output signal strings, when the object lens is in the focused condition. A signal extraction device selects a pair of effective signal strings from the pair of signal strings, based on a numerical value relating to the error amount stored in the memory. The focus adjustment condition for the object lens is then computed by the focus detection algorithm device, based on the effective signal strings selected by the signal extraction device.

The focus detection device also accomplishes its objectives by providing a pair of photoelectric line image sensor arrays having a plurality of photoelectric conversion elements. The focus detection optical system guides a pair of light rays from the subject through an object lens to the pair of photoelectric line image sensor arrays, where the pair of subject images are formed. The pair of photoelectric line image sensor arrays output a pair of signal strings corresponding to the light intensity distribution of the pair of subject images. A focus detection algorithm device determines a correlation amount at each shift position, while shifting the output signal strings stepwise in a fixed amount within a predetermined shift range.

The focus detection algorithm device also detects the focus adjustment condition of the object lens based on the shift position resulting in a minimum correlation amount. A memory stores a numerical value corresponding to the error amount between the output signal strings when the object lens is in the focused condition. The shift range for the calculation of the correlation amounts determined by the focus detection algorithm device is based on a numerical value corresponding to the stored error.

BRIEF DESCRIPTION OF THE INVENTION

The invention will be described in detail with reference to the following drawings in which like reference numerals refer to like elements and wherein.

DETAILED DESCRIPTION OF PREFERRED EMBODIMENTS

Figure 1:
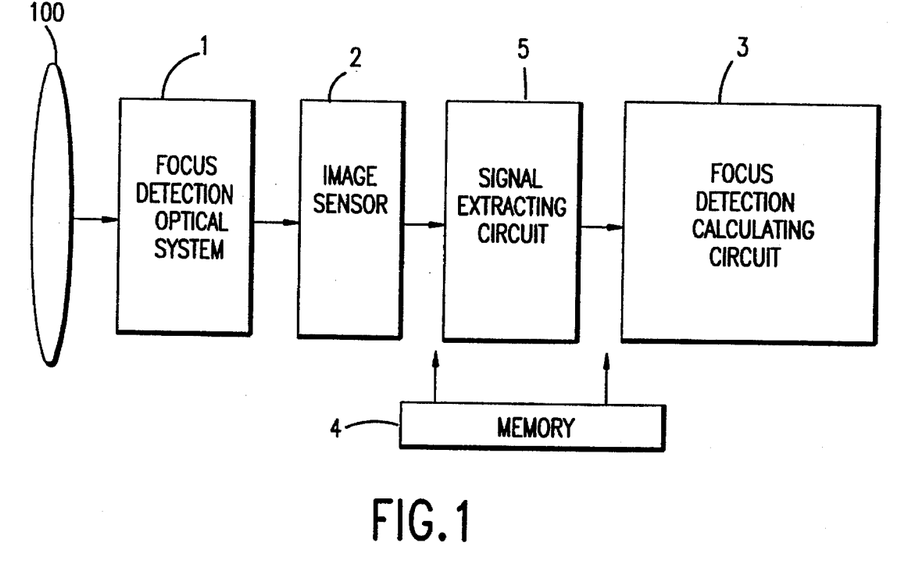
FIG. 1 is a schematic block diagram illustrating a focus detection device according to a first embodiment of the invention.

FIG. 1 is a schematic block diagram illustrating the focus detection optical system 1 according to a first embodiment of the invention. The focus detection optical system 1 guides light rays through an object lens 100 to an image sensor 2. As in the conventional system of FIG. 6, the focus detection optical system of the invention includes a field mask 200, a field lens 300, aperture stops 401,402 and re-imaging lenses 501,502. The field mask 200, field lens 300, aperture stops 401,402, re-imaging lens 501,502, and the image sensor arrays A,B are combined into one module 600. The module 600 can be installed into a camera body. The focus detection optical system 1 is not limited to the structure shown in FIG. 6. Any other equivalent structure or system may be used with this invention.

The image sensor 2 includes a pair of line image sensor arrays A,B, which include a plurality of photoelectric conversion elements. The line image sensor arrays A,B, each consist of two photoelectric conversion elements and transmit output signal strings a[i],b[i]. Output signal strings a[i],b[i] consist of 52 data bits each. However, the number of photoelectric conversion elements and data bits are not limited to two. Any number of photoelectric conversion elements and data bits may be used.

The memory 4 is an EEPROM or the like, which stores a numerical value relating to error amount between line image sensor arrays A,B. Signal extracting circuit 5 extracts effective signal strings ya[i],yb[i], where i=1→48 from the output signal strings a[i],b[i] of the image sensor 2, where i=1→52. The extraction is based on a numerical value relating to the error amount stored in the memory 4. Focus detection calculating circuit 3 carries out focus detection calculations using Equations (1)–(4), (6) and (7), while the effective signal strings ya[i],yb[i] are extracted by the signal extracting circuit 5. The focus detection calculating circuit 3 then detects the focus adjustment condition of the object lens 100.

The operation of the first embodiment will now be described.

An error amount Zx is directly stored in the memory 4 in units of the pitch of the photoelectric conversion elements. The signal extracting circuit 5 determines the photoelectric conversion leading element numbers As,Bs for the output signal strings. Leading element numbers As,Bs are at the leading end of the effective signal strings of the line image sensor arrays A,B. The leading element numbers As,Bs are determined based on the error amount Zx. The signal extracting circuit 5 extracts the effective signal strings.

Figure 2:
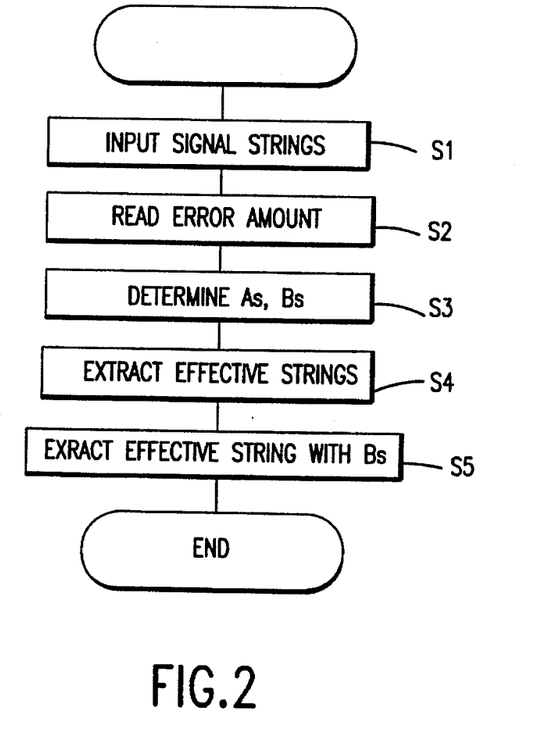
FIG. 2 is a flow chart showing the signal extraction operation according to the first embodiment.

The operation of the signal extracting circuit 5 is now described with reference to FIG. 2. In step S1, output signal strings a[i] and b[i], where i=1→52, are input to the signal extracting circuit 5 from the image sensor 2. In the step S2, error amount Zx is input from the memory 4. In step $3, the leading element numbers As,Bs are determined based on the error amount Zx. Using the leading element numbers As,Bs, the range over which the effective signal strings are extracted is shifted by amounts corresponding to the error amount Zx according to the following relationships:

| | | |
|---|---|---|
| | Zx < −3.5 | As=1, Bs=5 |
| −3.5 ≤ | Zx < −2.5 | As=2, Bs=5 |
| −2.5 ≤ | Zx < −1.5 | As=2, Bs=4 |
| −1.5 ≤ | Zx < −0.5 | As=3, Bs=4 |
| −0.5 ≤ | Zx < 0.5 | As=3, Bs=3 |
| 0.5 ≤ | Zx < 1.5 | As=4, Bs=3 |
| 1.5 ≤ | Zx < 2.5 | As=4, Bs=2 |
| 2.5 ≤ | Zx < 3.5 | As=5, Bs=2 |
| 3.5 ≤ | Zx | As=5, Bs=1 |

In step S4, the effective signal string for line image sensor array A is extracted, based on the leading element number As, according to Equation (8).

$$ya[i]=a[As+i-1], \quad (8)$$

where i=1→48.

In step S5, the effective signal string for line image sensor array B is extracted, based on the leading element number Bs, according to Equation (9).

$$yb[i]=b[Bs+i-1], \quad (9)$$

where i=1→48.

The focus detection calculating circuit 3 carries out focus detection calculations using Equations (1)–(4), (6) and (7) and the extracted effective signal strings ya[i],yb[i] to calculate a defocus amount. Since the effective signal strings ya[i],yb[i] are virtually identical, a local minimum value correlation amount C[L] can be obtained when the shift amount L=0. The correlation amount C[L] reaches its local minimum value, C[0], when the system is near the focused condition. Even if the amount L is changed, to 0, 1, −1, 2, −2, ..., lmax, and −lmax, the correlation amounts C[L] are calculated. The correlation calculations are interrupted when a defocus amount satisfying Equation (6) is obtained. Therefore, the defocus amount DF can be calculated in a short period of time by merely calculating the three correlation amounts C[0], C[1], and C[−1].

It is possible to store leading element numbers As,Bs in the memory 4 prior to the actual focus detection. Since it is not necessary to determine the leading element numbers As,Bs using the signal extracting circuit 5, the overall number of calculations in the device can be decreased.

Further, in the first embodiment, both leading element numbers As,Bs are variable when the effective signal strings are extracted. It is possible to have one of the leading element numbers fixed and have the other leading element number be variable. Thus, one of the leading element numbers As,Bs becomes unnecessary.

Furthermore, the correlation calculation of Equation (1) does not necessarily require the effective signal strings determined in the focus detection calculating circuit 3. It is possible to perform filter processing on the effective signal strings, calculate filter processing data, and carry out the correlation calculation of Equation (1) using the filter processing data.

In focus detection devices that have a plurality of focus detection areas and have focus detection optical systems and image sensors for each focus detection area, individual error amounts Zx may be stored for each focus detection area. Leading element numbers As,Bs may be determined for each individual focus detection area.

In addition, in focus detection devices where the signal strings output from line image sensors arrays are partitioned into a plurality of blocks, focus detection calculations may be carried out for each individual block. Defocus amounts DF are obtained, multiple error amounts Zx corresponding to the blocks may be stored, and the leading element numbers As,Bs may be determined based on the average of the multiple error amounts. Also, the leading element numbers As,Bs may be determined based on one of the error amounts among Zx from the multiple error amounts.

In the first embodiment, when a predetermined range within the signal string output from an image sensor is extracted as an effective signal string and focus detection calculations are carried out based on this extracted effective signal string, the range for the effective signal string is set according to the error amount Z. The operation for setting the range for the effective signal string is now described.

Figure 4A:
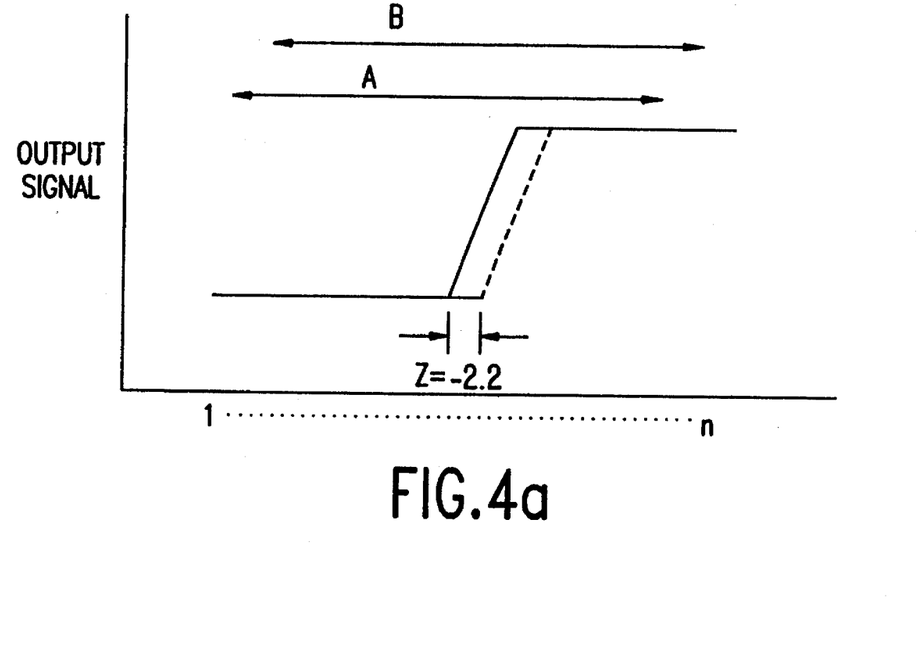
FIG. 4(a) is a graph showing the output signal string's shift amount.
Figure 4B:
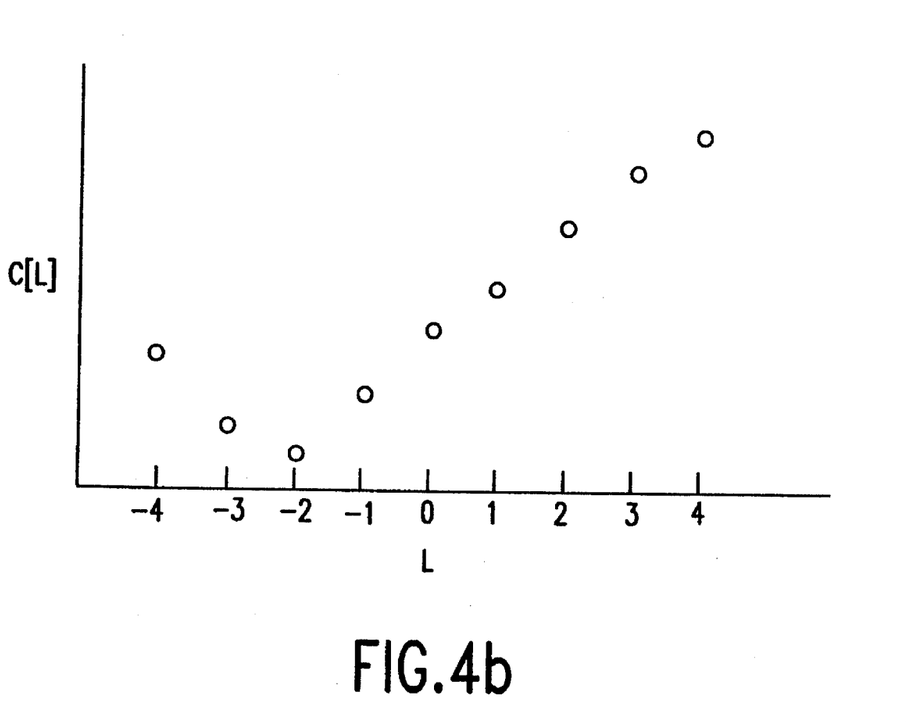
FIG. 4(b) is a graph showing the correlation amounts C[L] corresponding to FIG. 4(a)
Figure 5A:
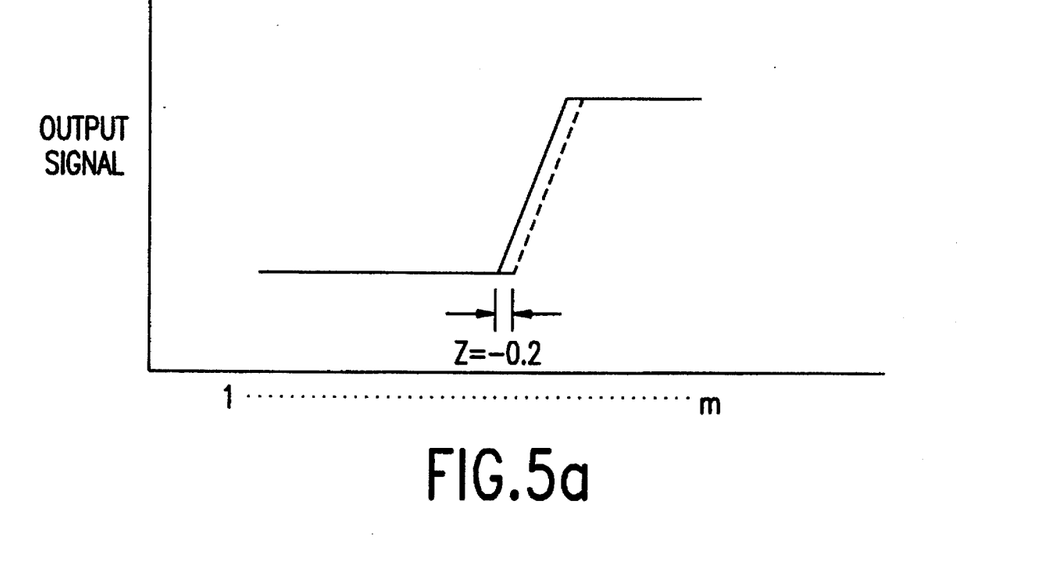
FIG. 5(a) is a graph showing the effective output signal strings when an error amount has occurred.
Figure 5B:
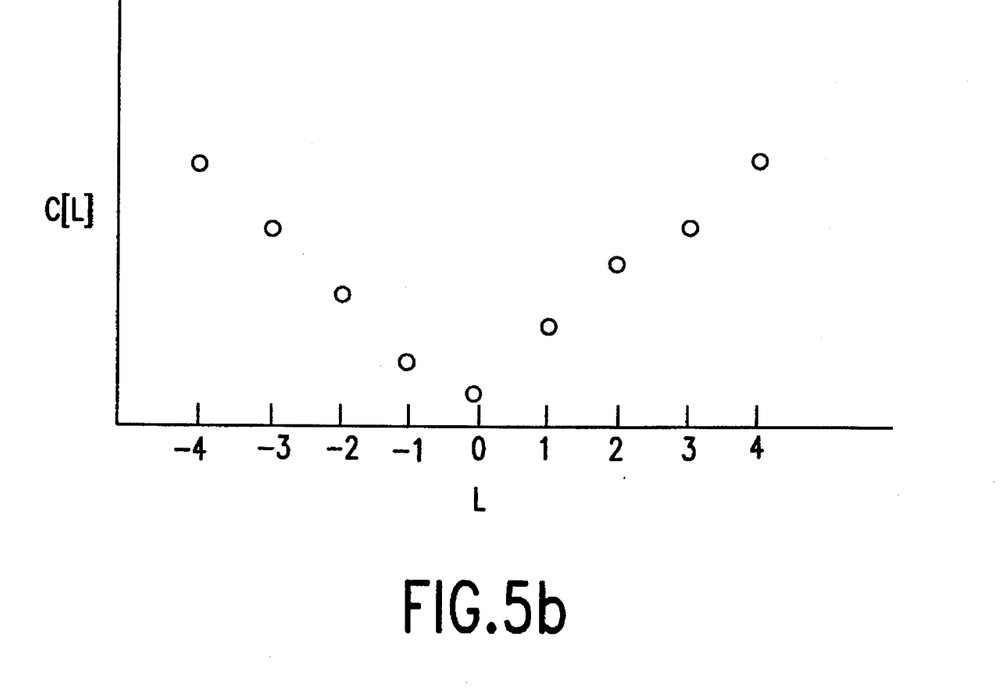
FIG. 5(b) is a graph showing correlation amounts C[L], corresponding to FIG. 5(a)

For example, as in FIG. 4(a), the signal strings' output from the image sensors are shifted −2.2 widths, with respect to each other, when the photo lens is in the focused condition. If the correlation amounts C[L] are calculated using Equations (1) and (2) using these output signal strings, C[−2] becomes the local minimum value, as illustrated in FIG. 4(b). The signal string range, shown by the dashed line in FIG. 4(a) is the effective signal string of the line array B. The range is shifted two width amounts shown by the solid line in FIG. 4(a), with respect to the effective signal string of the B line, which is extracted as the effective signal string of the A line. As a result, a pair of effective signal strings are obtained, which are shifted −0.2 widths as shown in FIG. 5(a). If the correlation amounts C[L] are calculated using Equations (1) and (2), C[0] becomes the local minimum value, as shown in FIG. 5(b), and the problem described above is resolved.

Figure 3:
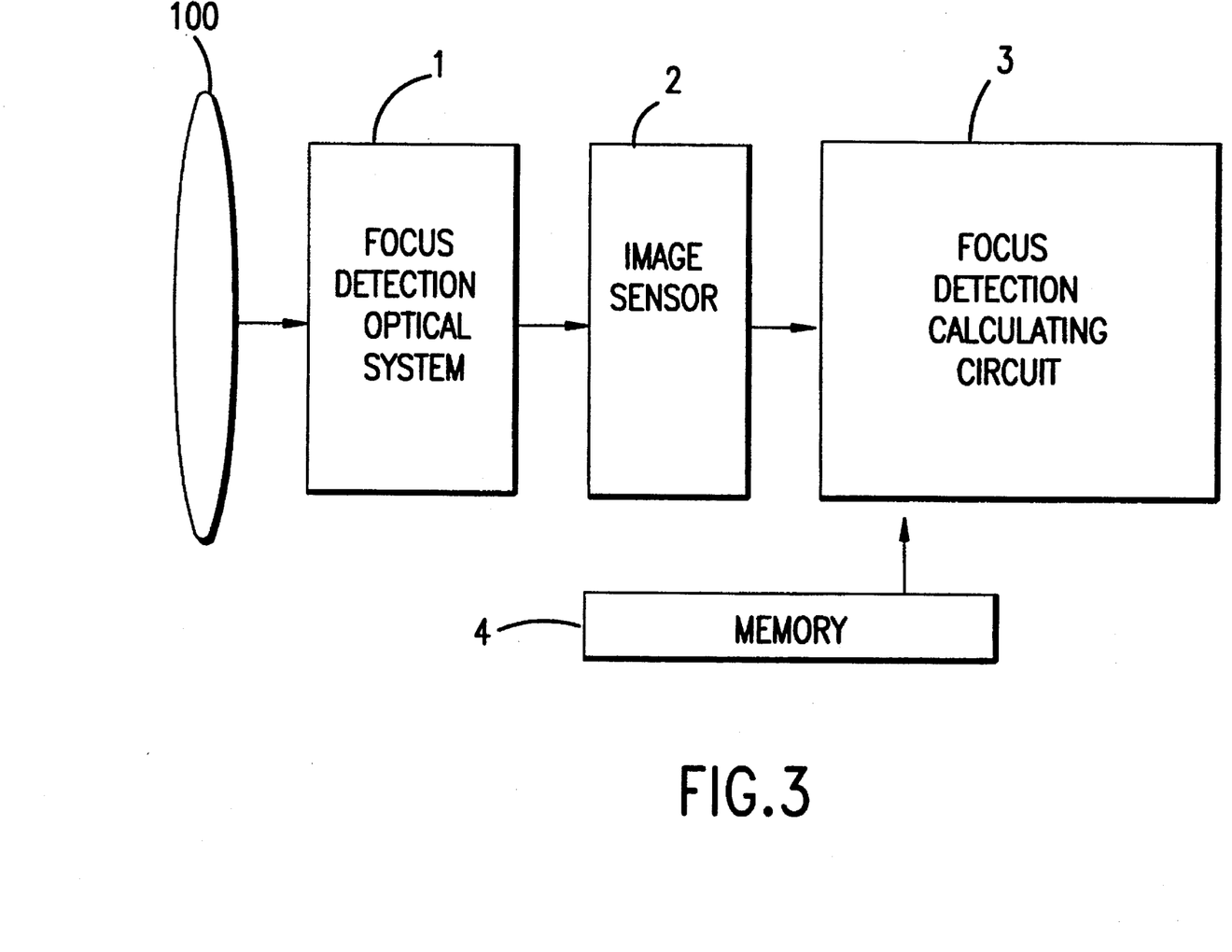
FIG. 3 is a schematic block diagram illustrating a focus detection device according to a second embodiment of the invention.

FIG. 3 is a schematic block diagram illustrating the structure of the second embodiment of the invention. In the second embodiment, the focus detection optical system 1 guides light rays through the object lens 100 to the image sensor 2. As in FIG. 6, the focus detection optical system comprises a field mask 200, a field lens 300, aperture stops 401,402, and re-imaging lenses 501,502. The field mask 200, field lens 300, aperture stops 401,402, re-imaging lens 501,502, and the image sensor arrays A,B are combined into one module 600. The module 600 can be installed into a camera body. The focus detection optical system 1 is not limited to the structure shown in FIG. 6, and any other equivalent structure or system may be used.

The image sensor 2 includes a pair of line image sensor arrays A,B, which each includes a plurality of photoelectric conversion elements. The line image sensor arrays A,B each include at least two photoelectric conversion elements and transmit output signal strings a[i],b[i], which each consist of 52 data bits. The number of photoelectric conversion elements and data bits is not limited. Any number of photoelectric conversion elements and data bits may be used.

The memory 4 is a memory, such as an EEPROM or the like, which stores a numerical value relating to the error amount between the line image sensor arrays A,B. Focus detection calculating circuit 3 carries out focus detection calculations for the output signal strings a[i], b[i] and detects the focus adjustment condition for the object lens 10.

The operation of the second embodiment will now be described.

The error amount Zx is stored directly in the memory 4. The units of the amount Zx are the same as the pitch of the photoelectric conversion elements. The focus detection calculating circuit 3 carries out several calculations. Since the calculation of the correlations amounts C[L] in the second embodiment differ from Equations (1) and (2) described above, these calculations will now be described.

The correlation amounts C[L] for the second embodiment are calculated using Equations (1) and (2), when the system is in the focused condition. A conversion amount Os, such that C[Os] becomes the local minimum value, is determined through the following relationships based on the error amount Zx:

|        | Zx < −3.5     | Os=−4 |
|--------|---------------|-------|
| −3.5 ≦ | Zx < −2.5     | Os=−3 |
| −2.5 ≦ | Zx < −1.5     | Os=−2 |
| −1.5 ≦ | Zx < −0.5     | Os=−1 |
| −0.5 ≦ | Zx < 0.5      | Os=0  |
| 0.5 ≦  | Zx < 1.5      | Os=1  |
| 1.5 ≦  | Zx < 2.5      | Os=2  |
| 2.5 ≦  | Zx < 3.5      | Os=3  |
| 3.5 ≦  | Zx            | Os=4  |

The shift amount L is converted to L' using the conversion amount Os, and the correlation amounts C[L] are calculated through Equation (11).

$$C[L]=\Sigma |a[i+L']-b[i]|, \quad (11)$$

where Σ indicates the summation of i=k→r.

L' in Equation (11) is converted from L using Equation (12).

$$L'=L+Os, \quad (12)$$

where L=−lmax, . . . , −2, −1, 0, 1, 2, . . . , lmax.

The initial value k and the final value r are calculated using Equation (13), based on the converted shift amount L'.

When L'≧0:

$$k=k0+INT\{-L'/2\} \quad (13)$$

$$r=r0+INT\{-L'/2\}$$

When L'<0:

$$k=k0+INT\{(-L'+1)/2\}$$

$$r=r0+INT\{(-L'+1)/2\}.$$

The correlation amounts C[Os-lmax] to C[Os+lmax] are calculated essentially using Equations (11)–(13) and the above relationships. The value for Os, which has a local minimum value during focusing, becomes the center of the shift range.

When the shift amount L is changed, to 0, 1, −1, 2, −2, . . . , lmax, and −lmax, L' correspondingly changes to Os, Os+1, Os−1, Os+2, Os−2, . . . , Os+lmax, and Os−lmax. Since C[0] is at a local minimum value near the focused condition, a reliable defocus amount DF satisfying Equation (6) can be quickly calculated using the three correlation amounts C[0], C[1], and C[−1].

It is possible to store the conversion amount in the memory 4 prior to the actual focus detection. Since it is not necessary to determine the conversion amount Os using the focus detection calculating circuit 3 and Equation (12), the overall number of calculations in the device can be decreased.

Further, similar to the first embodiment, it is possible to (1) perform filter processing on the signal strings and calculate filter processing data, instead of carrying out the correlation data, and (2) carry out the correlation calculation using the filter processing data instead of carrying out the correlation calculation using the effective signal strings determined by the focus detection calculating circuit 3.

In focus detection devices that have a plurality of focus detection areas within the photographic field and that are provided with focus detection optical systems and image sensors for each focus detection area, error amounts Zx may be stored for each individual focus detection area. Conversion amounts Os may be determined for each individual focus detection area.

In addition, in focus detection devices where the signal strings output from line image sensor arrays are partitioned into a plurality of blocks, focus detection calculations can be carried out for each individual block. Defocus amounts DF are obtained, multiple error amounts corresponding to each block may be stored, and the conversion amounts Os may be determined based on the average of the multiple error amounts. Also, the conversion amounts Os may be determined based on one of the error amounts among the multiple error amounts.

The shift range for the correlation calculations in the second embodiment is varied based on the value of the error amount Zx. The varying the shift range is now described. In an example, the signal strings output from the pair of line image sensors arrays A,B are shifted −2.2 conversion element widths, with respect to each other, when the object lens is in the focused condition. This is illustrated in FIG. 4(a). In this case, the corresponding shift range is −4 to 4, as shown in FIG. 4(b). Since the error amount is −2.2, the local minimum correlation amount is where the shift amount L=−2. The shift range then becomes −6 to 2, so the shift amount L=−2 will be centered in the shift range. This is equivalent to when C[0] becomes the local minimum value. The problem associated with the conventional devices described above is resolved.

In the first and second embodiments described above, the measurement of the error amount may be conducted within the camera body. Alternatively, the measurement of the error amount may be by a measuring device separate from the camera body.

Similarly, when the leading element numbers As,Bs and/or the conversion amount Os are stored in the error amount memory 4 in advance, the measurements of these values may be carried out, either within the camera body or through a measuring device separate from the camera body.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A focus detection device that determines a focus adjustment amount of a photo-optical system having at least an object lens, the focus detection device comprising:

a pair of photoelectric line image sensor arrays having a plurality of photoelectric conversion elements, the pair of photoelectric line image sensor arrays being capable of outputting a pair of signal strings corresponding to light intensity distributions from a pair of subject images;

a focus detection optical system that guides at least a pair of light rays from a subject through the object lens and to the pair of photoelectric line image sensor arrays to form the pair of subject images;

a controller having a focus detection algorithm section that determines focus adjustment condition of the object lens based on the pair of signal strings;

a memory that stores an error or offset amount between the pair of signal strings when the system is in a focused condition; and a signal extractor that selects a pair of effective signal strings from the pair of signal strings based on a value relating to the error amount stored in the memory, wherein the controller computes a focus adjustment amount based on the pair of effective signal strings selected by the signal extractor.

2. A device according to claim 1, wherein the error amount is preset in the memory.

3. A device according to claim 1, wherein the error amount is determined for the focus detection device.

4. A device according to claim 1, further including a module, the module including a field mask, a field lens, a diaphragm, an image sensor and a re-imaging lens.

5. A focus detection device that determines a focus adjustment amount of a photo-optical system having at least an object lens, the focus detection device comprising:

a pair of photoelectric line image sensor arrays having a plurality of photoelectric conversion elements, the pair of photoelectric line image sensor arrays being capable of outputting a pair of signal strings corresponding to light intensity distributions of a pair of subject images, wherein the pair of signal strings may coincide or be at shifted positions from each other relatively corresponding to the focus state of the lens;

a focus detection optical system that is capable of guiding a pair of light rays from a subject through the object lens to the pair of photoelectric conversion arrays to form the pair of subject images;

a controller having a focus detection algorithm section that determines correlation amount at each shift position and stepwise shifting the signal strings in a fixed amount and determines the focus adjustment condition of the object lens based on a shift position that results in minimum correlation between the signal strings; and a memory that stores an error or offset amount between the signal strings when the object lens is in the focused condition, wherein the controller determines the shift range for the correlation amounts based on the error amount stored in the memory.

6. A device according to claim 5, wherein the error amount is preset in the memory.

7. A device according to claim 5, wherein the error amount is determined for the focus detection device.

8. A device according to claim 5, further including a module, the module including a field mask, a field lens, a diaphragm, an image sensor and a re-imaging lens.

9. A focus detection device that determines a focus adjustment amount of the photo-optical system having at least an object lens, the focus detection device comprising:

means for outputting a pair of signal strings from a pair of photoelectric line image sensor arrays having a plurality of photoelectric conversion elements, the pair of signal strings corresponding to light intensity distributions from a pair of subject images;

focus detection optical means for guiding at least a pair of light rays from a subject through the object lens and to the pair of photoelectric line image sensor arrays to form the pair of subject images;

focus detection algorithm means for determining a focus adjustment condition of the object lens based on the pair of signal strings;

means for storing an error or offset amount between the pair of signal strings when the system is in a focused condition; and signal extraction means for selecting a pair of effective signal strings from the pair of signal strings based on a value relating to the error amount stored in the storing means, wherein the focus detection algorithm means computes a focus adjustment amount based on the pair of effective signal strings selected by the signal extraction means.

10. A device according to claim 9, wherein the error amount is preset in the storing means.

11. A device according to claim 9, wherein the error amount is determined for the focus detection device.

12. A device according to claim 9, further including a module, the module including a field lens, a diaphragm, an image sensor and a re-imaging lens.

13. A focus detection device that determines a focus adjustment amount of a photo-optical system having at least an object lens, the focus detection device comprising:

means for outputting a pair of signal strings corresponding to light intensity distributions of a pair of subject images from a pair of photoelectric line image sensor arrays having a plurality of photoelectric conversion elements, wherein the pair of signal strings may coincide or be at positions shifted from each other relatively corresponding to the focus state of the lens;

focus detection optical means for guiding a pair of light rays from a subject through the object lens to the pair of photoelectric conversion arrays to form the pair of subject images;

focus detection algorithm means for determining a correlation amount at each shift position and stepwise shifting the signal strings in a fixed amount and determining the focus adjustment condition of the object lens based on a shift position that results in minimum correlation between the signal strings; and means for storing an error or offset amount between the signal strings when the object lens is in the focused condition, wherein the focus detection algorithm means determines the shift range for the correlation amounts based on the stored error amount.

14. A device according to claim 13, wherein the error amount is preset in the memory.

15. A device according to claim 13, wherein the error amount is determined for the focus detection device.

16. A device according to claim 13, further including a module, the module including a field mask, a field lens, a diaphragm, an image sensor and a re-imaging lens.

17. A focus detection method for determining a focus adjustment amount of a photo-optical system having at least an object lens, the method comprising the steps of:

guiding a pair of light rays from a subject through the object lens to a pair of photoelectric conversion arrays to form a pair of subject images;

outputting a pair of signal strings corresponding to light intensity distributions of the pair of subject images, wherein the pair of signal strings may coincide or be at shifted positions from each other relatively corresponding to the focus state of the lens;

determining a correlation amount at each shift position and stepwise shifting the signal strings in a fixed amount within a predetermined shift range;

detecting the focus adjustment condition of the object lens based on the shift position resulting in a minimum correlation between the signal strings;

storing an error or offset amount between the signal strings when the system is in the focused condition; and determining a modified shift range for the correlation amounts based on the stored error amount.

18. A method according to claim 17, wherein the step of storing the error amount occurs before the determining of the modified shift range.

19. A focus detection method for determining a focus adjustment condition of a photo-optical system having at least an object lens, the method comprising the steps of:

guiding a pair of light rays from a subject through the object lens to a pair of photoelectric line image sensor arrays;

outputting a pair of signal strings corresponding to light intensity distributions from a pair of subject images, wherein the pair of signal strings may coincide or be at shifted positions from each other relatively corresponding to the focus state of the lens;

determining a focus adjustment condition of the object lens based on the pair of signal strings, storing an error or offset amount between the pair of signal strings when the system is in a focused condition; and selecting a pair of effective signal strings from the pair of signal strings based on a numerical value relating to the stored error amount; and computing a focus adjustment based on the selected pair of effective signal strings.

20. A method according to claim 19, wherein the step of storing the error amount occurs before the determining of the focus adjustment condition.

* * * * *